(12) United States Patent
Vamadevan et al.

(10) Patent No.: US 11,394,826 B1
(45) Date of Patent: Jul. 19, 2022

(54) HANDLING INCOMING COMMUNICATION DURING COMMUNICATION SET UP

(71) Applicant: T-MOBILE USA, INC., Bellevue, WA (US)

(72) Inventors: Muhilan Vamadevan, Bellevue, WA (US); Karthik Chandrasekaran, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/187,932

(22) Filed: Mar. 1, 2021

(51) Int. Cl.
*H04M 3/428* (2006.01)
*H04M 3/533* (2006.01)
*H04M 3/436* (2006.01)

(52) U.S. Cl.
CPC ....... *H04M 3/4288* (2013.01); *H04M 3/4283* (2013.01); *H04M 3/53325* (2013.01); *H04M 3/436* (2013.01); *H04M 2203/408* (2013.01)

(58) Field of Classification Search
CPC .. H04M 3/4283; H04M 3/4288; H04M 3/436; H04M 3/53325; H04M 2203/408
USPC ............................ 370/351–357; 379/215.01, 379/142.01–142.18
See application file for complete search history.

(56) References Cited

U.S. PATENT DOCUMENTS 5,995,825 A * 11/1999 Hietalahti ............. H04W 76/10
455/414.4
6,490,348 B1 * 12/2002 Oomori ............... H04M 3/4285
379/207.04

* cited by examiner

*Primary Examiner* — Hemant S Patel
(74) *Attorney, Agent, or Firm* — Marshall, Gerstein & Borun LLP

(57) ABSTRACT

Methods, a system, and computer readable media are disclosed to provide an enhanced Communication Waiting applications service. Enhancements include a method for handling an incoming communication received before an outgoing communication is acknowledged and a method to handle a second incoming communications to a user device before the first incoming communication is acknowledged by the user. Such methods remove limitations on existing techniques by allowing users to select between pending and new incoming calls. In some embodiments, calls not selected by the users are placed on hold or routed to voicemail.

10 Claims, 6 Drawing Sheets

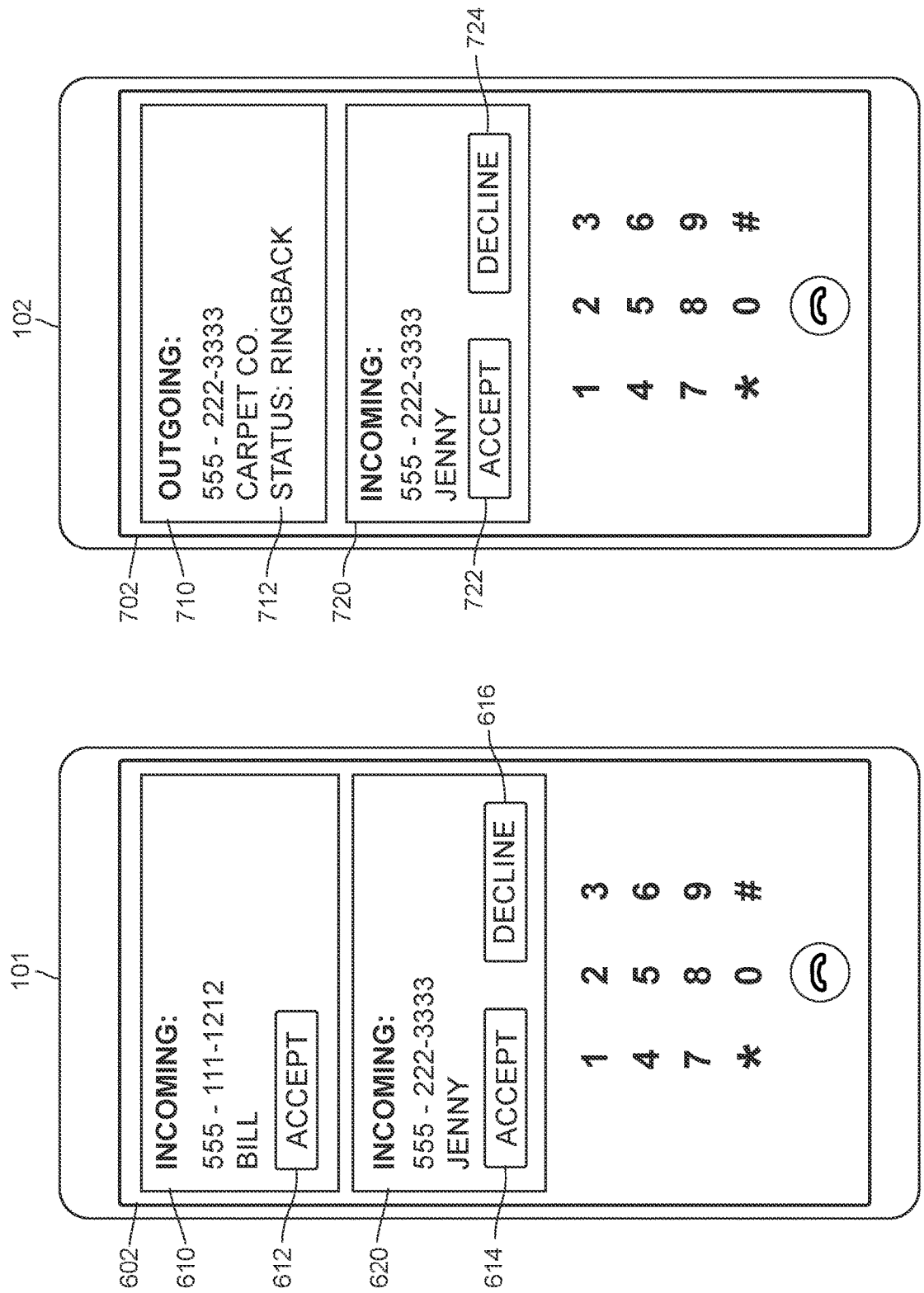

HANDLING INCOMING COMMUNICATION DURING COMMUNICATION SET UP

TECHNICAL FIELD

This innovation relates to the Communication Waiting (CW) telecommunication feature during the setup of a communication, such as a voice or video call.

BACKGROUND

The Communication Waiting (CW) telecommunications feature, sometimes referred to as Call Waiting, may apply to voice calls, voice conferencing, video calls, audio video conferencing communication, or other voice or video communication traffic. The CW feature helps the user to avoid missing important communications and gives the user the opportunity to select the most important of several concurrent or near concurrent communications. The feature informs a telecommunications user that very limited resources are available for an incoming communication and that a selection needs to be made. Once informed of a new incoming communication, the user has a choice of accepting, rejecting or ignoring the waiting communication. The rejected communication may be ignored, sent a busy signal, be routed to voicemail or be put on hold waiting for the intended recipient to end the selected communication. In some cases, the user may toggle back and forth to the communication that was on hold by using a "hook flash" or "flash." On many devices, a user may hear a special tone or hear a stutter tone during an already established communication when another communication is waiting. Some User Equipment (alternately referred to as UE, UE1, UE2, UE3 or "communication device" throughout this disclosure) may have a special button labeled "Flash", "Hook Flash", "R" or "Recall" button to toggle between the active and the inactive communication. On some other communication devices, such as on smart phones, the user may see on the display who is trying to reach them while they are engaged in another communication and may have soft keys on the display to acknowledge, terminate or initiate a communication. The CW feature, may be activated for a particular user, or activated at the network level for all users.

Currently, however, the communication waiting feature is only active when the party is actively in a communication, such as when actively engaged in an already established voice call. In the several second duration that a communication session is being set up, including when the called device may be ringing and waiting to be answered, the Communication Waiting feature is not available to either the called or calling party. A third party attempting to reach the called or calling party is blocked and receives a busy notification, or the third party is automatically routed to voicemail regardless of the wishes of the called party. This legacy restriction of blocking subsequent calls after the call setup procedure has started was mandated by the trunk blocking used in legacy circuit-switched calls. This treatment has continued into internet protocol communications routing, which historically attempts to mimic the functionality of circuit-switched calling. Since the call setup phase, including the ringing and the ring back, may take a window of several seconds of time, it is very possible for a third party to attempt to reach either the called or the calling party in that communication setup window of time, with the called party typically being unaware of the incoming call until she checks her voicemail. The lack of CW feature availability during setup of communications is an unmet need and is the problem solved by this innovation.

SUMMARY

The disclosed Communication Waiting (CW) service informs a telecommunications user, even during the setup of a communication, that limited resources are available for an incoming communication and prompts the user for a preferred communication given the limited resources. This resource may be the audio or video channel of the network provider or may include the microphone or camera of the communication device.

In internet protocol (IP) based telephony, the protocols may, unlike legacy telephony, often permit near-concurrent notifications to the same user. This concurrent notification may be enabled, for example, by the Session Internet Protocol (SIP), as described by the Internet Engineering Task Force (IETF). The SIP protocols include variants RSVP, RTP, RTSP, SDP, SIMPLE or DUALVIDEO protocols. The concurrent notification may also be enabled by any of several older H.323 protocols together with a Gateway Server.

An Application Server (AS) may be a SIP proxy as specified in sub clause 5.7.4 of 3GPP TS 24.229, and may operate as a routing back-to-back user agent (B2BUA) as specified in sub clause 5.7.5 of 3GPP TS 24.229. Also, for the purposes of this disclosure, an AS may also refer to a Gateway Server as specified by H.323 standards.

The Application Server, such as a Telephony Application Server (TAS), may be used to enable telecommunications features such as CW and may be modified as described in this disclosure. The AS contains the service logic that provides the basic call-processing services, including digit analysis, routing, call setup, call waiting, call forwarding, and conferencing. The AS also provides the service logic for invoking the media servers to provide the appropriate call progress tones and announcements. The service logic comprises executable instructions that are stored on the non-transitory computer-readable storage medium of the AS.

If the calls are originating or terminating on the Publicly Switched Telephone Network (PSTN), the TAS or AS also provides the SIP signaling to the Media Gateway Control Function (MGCF) to instruct the media gateways to convert the PSTN Time-Division Multiplexing (TDM) voice bit stream to an IP Real-Time Transport Protocol (RTP) stream. The TAS then directs the stream to an IP address of the correct IP phone. In this innovation, the AS is configured to enhance the communication waiting feature to provide notification of an incoming communication from a third party during the setup and ring back phases of a previously initiated communication between two other parties.

Various embodiments are described herein that provide improvements over the known art to the CW service including CW from a third party initiating a new communication to either the called party or the calling party while the previous call is still being setup. This can be accomplished in an IP telecommunications environment by changes in the configuration or in the executable instructions stored in the AS.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIG. 6 illustrates a sample screen of a user equipment device that has received an incoming communication while still setting up an outgoing communication.

FIG. 7 illustrates a sample screen of another user device that has received a second incoming communication before the first incoming communication is acknowledged by the user.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

Figure 1:
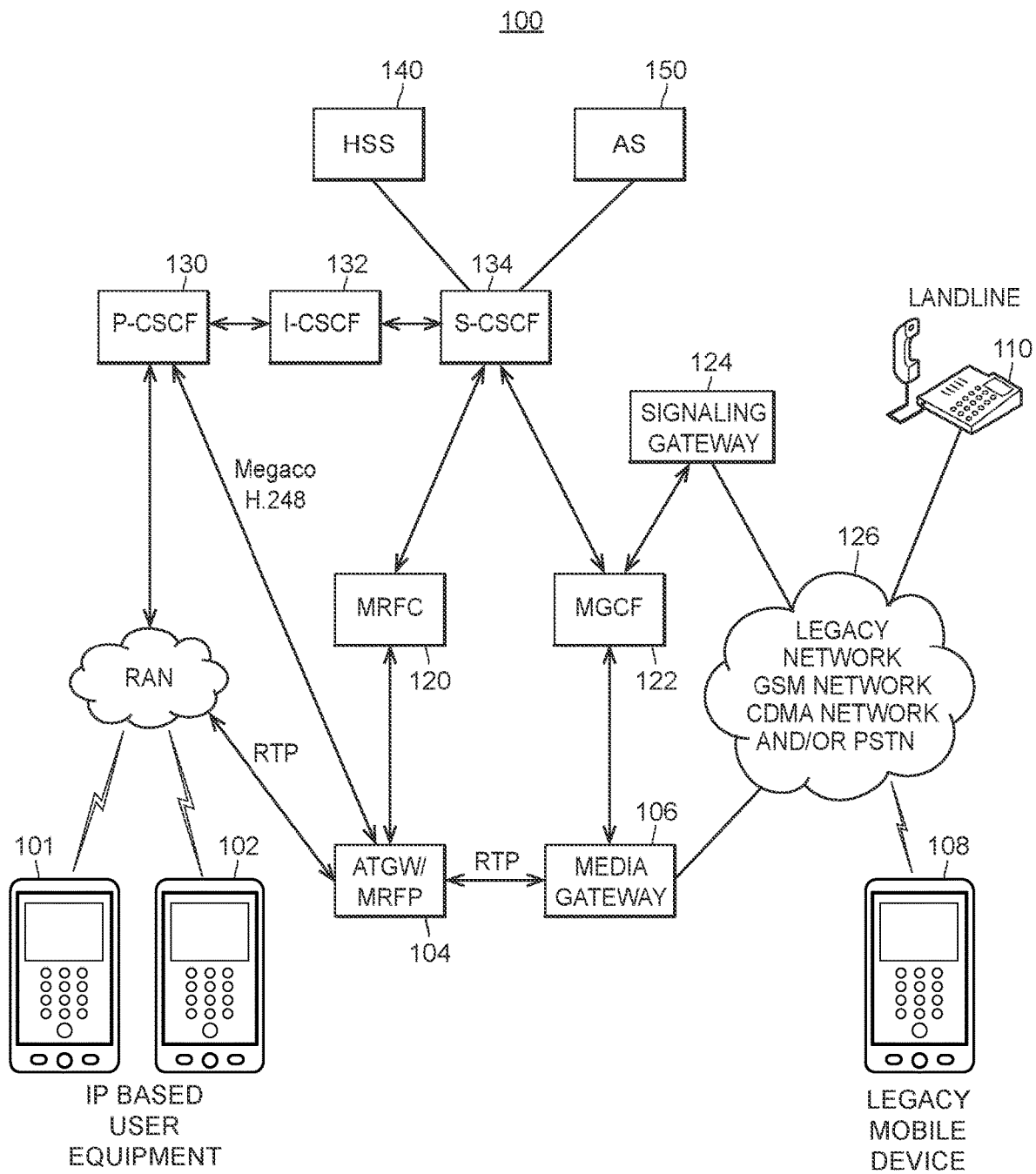
FIG. 1 illustrates a block diagram of an example communication system in accordance with embodiments of the present disclosure, including a plurality of user equipment (UE) devices.

FIG. 1 illustrates a block diagram of an exemplary communication system 100. FIG. 1 includes various components configured as an Internet Protocol (IP) Multimedia Subsystem (IMS), as well as its connectivity to a legacy network 126. An IMS is a subsystem for delivering IP multimedia services to IP-based devices using IP-based protocols including voice and video, which typically uses Session Internet Protocol (SIP) or the H.323 protocol. FIG. 1 shows communication devices, such as User Equipment 1 (UE1) 101 and User Equipment 2 (UE2) 102, as well as an Application Server (AS) 150. In FIG. 1, UE1 101 and UE2 102 are wireless devices communicating through one or more radio access networks (not shown). Both wireless devices eventually communicate through the radio access networks to a Proxy-Call Session Control Function (P-CSCF) 130, which, in the IMS architecture, is attached to the Interrogating-Call Session Control Function (I-CSCF) 132 that selects and attaches to a Serving-Call Session Control Function (S-CSCF) 134, which connects the communication to an application server (AS) 150. The P-CSCF 130 may use Megaco/H.248 protocol to connect to either the Media Resource Function Processor (MRFP) 104 or the Media Resource Function Controller (MRFC) 120 and the same protocol may be used between the MRFP 104 and the MRFC 120. As shown in FIG. 1, the P-CSCF 130 is connected to the Access Transfer Gateway (ATGVV) and MRFP 104, functionalities of which are combined in one box in this diagram. As also shown in FIG. 1, the AS 150 can connect to multimedia elements via the S-CSCF 134. The S-CSCF 134 connects to the ATGW/MRFP104 via a MRFC 120. The S-CSCF 134 may also connect to a Media Gateway Control Function (MGCF) 122.

In one embodiment, the AS 150 may be a specialized Telephony Application Server (TAS), which performs customary calling features or may be any of a variety of other Application Servers such as a Multimedia Telecommunication Application Server (MTAS) or a Video Conferencing Application Server, which performs conferencing, video features, or call center services. The AS 150 enables features which may be enabled on a per subscriber or network wide basis as enabled at a Home Subscriber Server (HSS) 140 which is contacted by the AS 150 to authorize features on a per subscriber basis. The AS 150 may also access the legacy network 126 by use of Media Gateway Controller Function (MGCF) 122, Signaling Gateway 124 and Media Gateway 106. The Legacy Network 126 may include other mobile networks such as 2G GSM or CDMA mobile networks as well as landlines accessed by the Public Switch Telephone Network (PSTN). Landline Phones 110 and Legacy 2G Mobile Phones 108 are accessible through the Legacy Network 126 as shown on FIG. 1. The AS 150 may also make use of the ATGW/MRFP 104 for media manipulation, such as outgoing tones, and collecting authorization password tones for conference call setup. The ATGW/MRFP 104 can access the AS 150 by way of the S-CSCF 134 and the MRFC 120, for outgoing announcements as shown in FIG. 1. The AS 150 contains applications which may duplicate those found in a circuit based network and may include novel applications that involve media manipulation which may be used with, for example, video calling. In this environment, instead of being configured to mimic the known circuit based communication waiting feature found in the legacy network, a CW application of the AS 150 is configured to enhance the CW feature as described herein.

Figure 2:
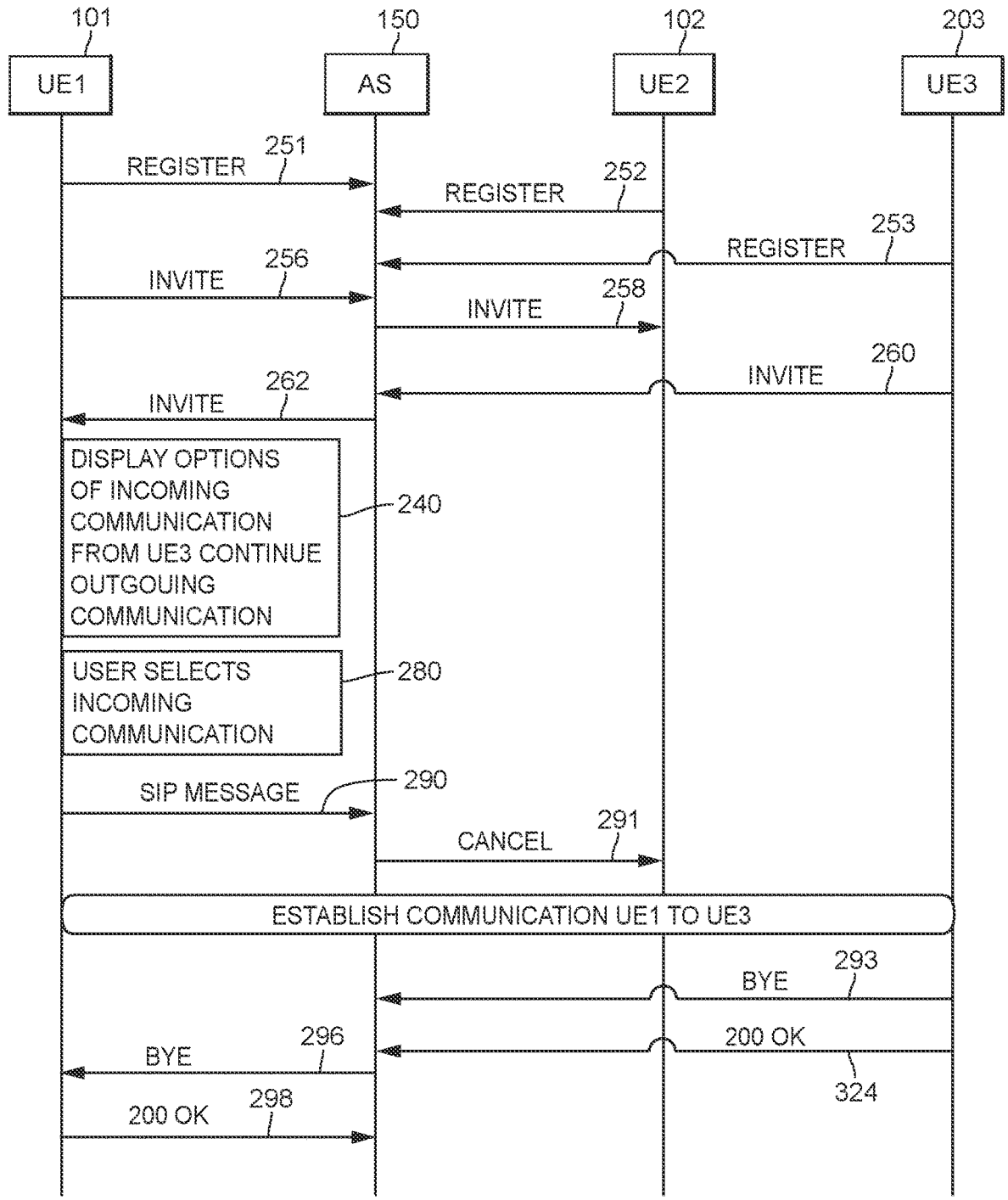
FIG. 2 illustrates an exemplary message ladder diagram in which a call from User Equipment 1 (UE1) is being set up to User Equipment 2 (UE2). An incoming communication from User Equipment 3 (UE3) to UE1 is then received by the Application Server (AS) and directed to UE1, and a notification displayed on UE1 before the call setup is completed between UE1 and UE2.

FIG. 2 and other examples in this disclosure assume that CW functionality is enabled at the Home Subscriber Server (HSS) for each piece of user equipment individually or for the network as a whole. Shown in FIG. 2 is an example message ladder diagram in which a communication between communication devices UE1 101 and UE2 102 is in the process of being set up when an incoming invitation from another party, User Equipment 3 (UE3) 203, is received by the AS 150. The ladder diagrams of FIG. 2 and FIG. 3 begin with the UE devices registration messages as shown by the REGISTER messages of the SIP protocol. In message 251, UE1 101 registers with the AS 150. Likewise, message 252 registers UE2 102, and message 253 registers UE3 203 consistent with the SIP protocol. Next, UE1 101 sends a SIP INVITE message 256 destined to UE2 102, which is received and forwarded by the AS 150 to UE2 102 as the SIP INVITE message 258. However, the user associated with UE2 102 does not yet answer the communication. Next, as illustrated, the AS 150 receives a SIP INVITE message 260 from UE3 203 associated with another party.

Unlike known art, which would return a busy signal or perform a busy-transfer to voicemail under such conditions, the AS 150 then routes the SIP INVITE from UE3 203 to UE1 101 in message 262. Also unlike the known art, in block 240, UE1 101 displays a notice of the incoming communication from UE3 203 to indicate to the user of UE1 101 that there is an incoming communication, thus offering the user of UE 1 101 a choice to continue the communication with UE2 102 or cancel the communication with UE1 101 and accept the communication from UE3 203. In block 280, the user associated with UE2 102 chooses to accept the incoming communication from UE3 203. Any call setup/control plane protocol can be used to achieve this goal such as, for example SIP protocol or, alternatively, HTTP/REST protocols. Based upon a user selection or a default rule, UE1 101 transmits the user's selection to the AS 150 in a message 290, such as in the payload of a SIP MESSAGE command used in this embodiment. Upon receiving the selection of UE3 203, the AS 150 is configured to send a cancellation message 291 to UE2 102.

The AS 150 then enables the communication between UE3 203 and UE1 101 by establishing a communication session 292 between the devices. After the communication has ended, either UE1 or UE3 may terminate the conversation. As illustrated, UE3 sends a SIP BYE message 293 to the AS 150. In other embodiments, UE1 101 may send such a SIP BYE message to the AS 150, or another request to terminate the communication may be used. The termination request is forwarded by the AS 150 to UE1 in message 296, and the AS 150 acknowledges the termination request from UE 3 203 with a 200 OK message 294 to UE 3 203. In message 298, the UE1 101 acknowledges the BYE message to the AS 150.

When the conversation between UE1 101 and UE3 203 is terminated, the AS 150 may be configured to automatically reconnect the communication between UE1 101 and UE2 102. The AS 150 may also be configured to reconnect the communication after prompting the user of UE1 101 if she wants to reinitiate the previously suspended call to UE2 102 after the call between UE1 101 and UE3 203 is completed. This prompt may, for example, take the form of a SMS, MMS, or recorded announcement to the user of UE1 101 to ask if the previously suspended call should be reinitiated. If the user of UE1 101 indicates she wants to reinitiate the communication with UE2 102, then AS 150 sends SIP messaging, to reinitiate the previously terminated call with UE1 101.

Figure 3:
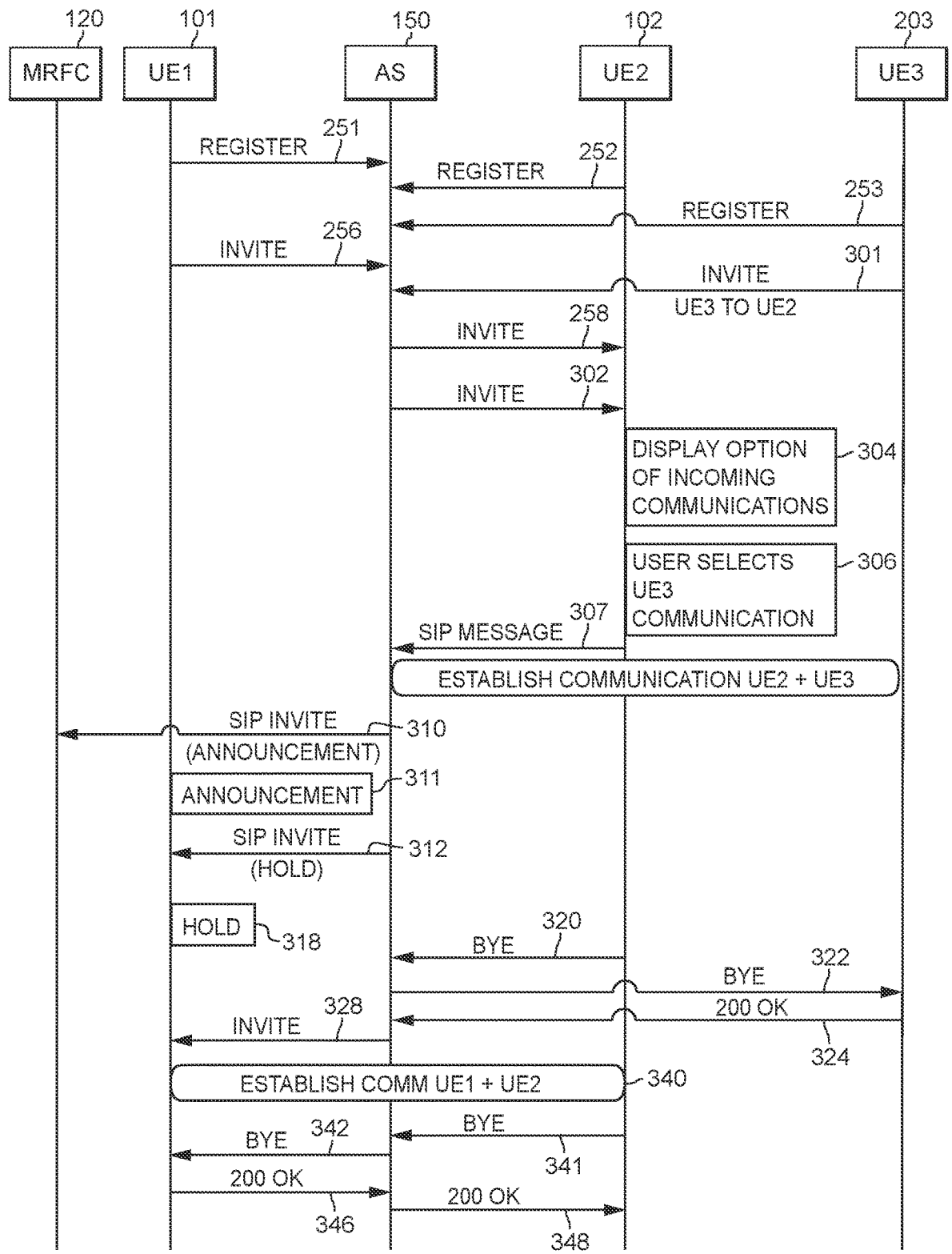
FIG. 3 illustrates an example ladder diagram in which a call from User Equipment 1 (UE1) is being set up to User Equipment 2 (UE2). An incoming call from User Equipment 3 (UE3) to UE2 is received by the Application Server (AS) and transmitted by the AS to UE2 with a notification displayed on UE2 before the call from UE1 is answered by UE2. The user of UE2 is then given the option to select the communication from UE1 or UE3.

FIG. 3 shows a message ladder diagram in which communication is being set up from UE1 101 to UE2 102, during which an incoming communication from UE3 203 destined to be routed to UE2 102 also arrives at the AS 150. In FIG. 3, the devices are all registered by messages 251, 252 and 253. Next, UE1 101 then sends a SIP INVITE message 256 destined to UE2 102 that is routed through AS 150. The AS 150 forwards this as message 258 to UE2 102. At this point, the communication initiated by message 258 has not yet been acknowledged, and the communication session between UE1 101 and UE2 102 has not yet been established. Prior to acknowledgement, UE3 203 then sends a SIP INVITE message 301 to the AS 150 in an attempt to connection to UE2 102. The AS 150 forwards this SIP INVITE to UE2 102 in message 302, in contrast to previous systems. In block 304, we see that the user associated with UE2 is presented with a choice of two incoming communications awaiting input from the user (which may be similar to the example illustrated in FIG. 6 for UE1 101, discussed below). In another embodiment of this disclosure, not illustrated, the AS 150 may delay the SIP INVITE 302 message for a predetermined period of time, playing a recorded announcement to the second caller until the user of UE2 102 has made a selection to accept or reject the first received communication. Returning to the illustrated embodiment, in block 306, the user associated with UE2 102 selects one of the two incoming communications. In this embodiment, the user selects the communication with UE3 203. Based upon such selection, a SIP MESSAGE 307 is sent from UE2 102 to AS 150 containing the user's selection. The AS 150 then establishes the communication between UE2 and UE3 203.

The AS 150 may send one or more messages (not shown) to end communication from the AS 150 to end the call from UE1 which was not selected by the user of UE2, or AS 150 may optionally send another message such as SIP INVITE (Announcement) 310, to the MRFC 120, as illustrated, which causes an announcement 311 to be played to UE1 101, This announcement may indicate, for example, that the user of UE1 should "please stand-by" or "please wait to be connected." The AS 150 then may send a message such as a SIP INVITE (HOLD) 312 to UE1 101 which causes UE1 101 to be placed on hold. The hold is shown in block 318. In some embodiments, not illustrated, the AS 150 may route the attempted communication from UE1 101 to voicemail to leave a message for the user of UE2 102. Meanwhile, communication between UE2 102 and UE3 203 continues until terminated by either party. As shown, the user of UE2 102 may terminate the communication session by sending a SIP BYE message 320 to the AS 150, causing the AS 150 to send a corresponding BYE message 322 to UE 3 203 and receive a 200 OK message 324 from UE3 203 to terminate the call as per the SIP protocol. In the illustrated embodiment, the AS 150 automatically reinitiates the communication between UE2 102 and UE1 101 after the communication between UE2 102 and UE3 203 has terminated. This example shows the AS 150 automatically sending a SIP INVITE message 328 to UE1 101. This reconnection between UE1 101 and UE2 102 may happen automatically, such as when UE1 101 has been on hold as shown in the FIG. 3, or may occur after prompting the user of UE2 102 by any of several means if she wishes to reconnect with UE1 (such as, for example, a recorded announcement, SMS, or MMS asking for confirmation from the user of UE2). When a communication connection 340 is established between UE1 101 and UE2 102, the users of such devices may communicate until the communication connection is terminated, such as by a SIP BYE message 340 from UE2 to the AS 150. Upon receiving such terminating message, the AS 150 sends a corresponding SIP BYE message 342 to UE1 101, which responds to the AS 150 with a 200 OK message 346. The AS 150 then sends a corresponding response to UE2 102 as a 200 OK message 348, as which point the communication session is terminated.

In another embodiment, the AS 150 may terminate the connection with the nonselected attempted communication (i.e., the attempted connection between UE2 102 and UE1 101). In such embodiments, the AS 150 sends an immediate message, such as a SIP BYE message, to the UE associated with the nonselected communication to terminate that communication. In yet another embodiment, the nonselected communication attempt (which may be either the first or the second communication attempt) is routed by the AS 150 to a voicemail box associated with the user of UE2 102. This is notably different from the prior art, which always blocks or routes the second communication attempt, but not the first, to the voicemail box during the call setup phase.

In yet another embodiment, when the nonselected communication is on hold, the user of UE2 102 may toggle between the selected and the nonselected communications (i.e., between UE1 101 and UE3 203), placing the initially selected communication on hold while communication is initiated or continues with the previously nonselected entity. This toggle between communications may, for example, involve the "Flash", "Hook Flash" or an "R" or "Recall" button on the user equipment. Additional or alternative methods of handling the nonselected communication attempt may be used in various embodiments.

Figure 4:
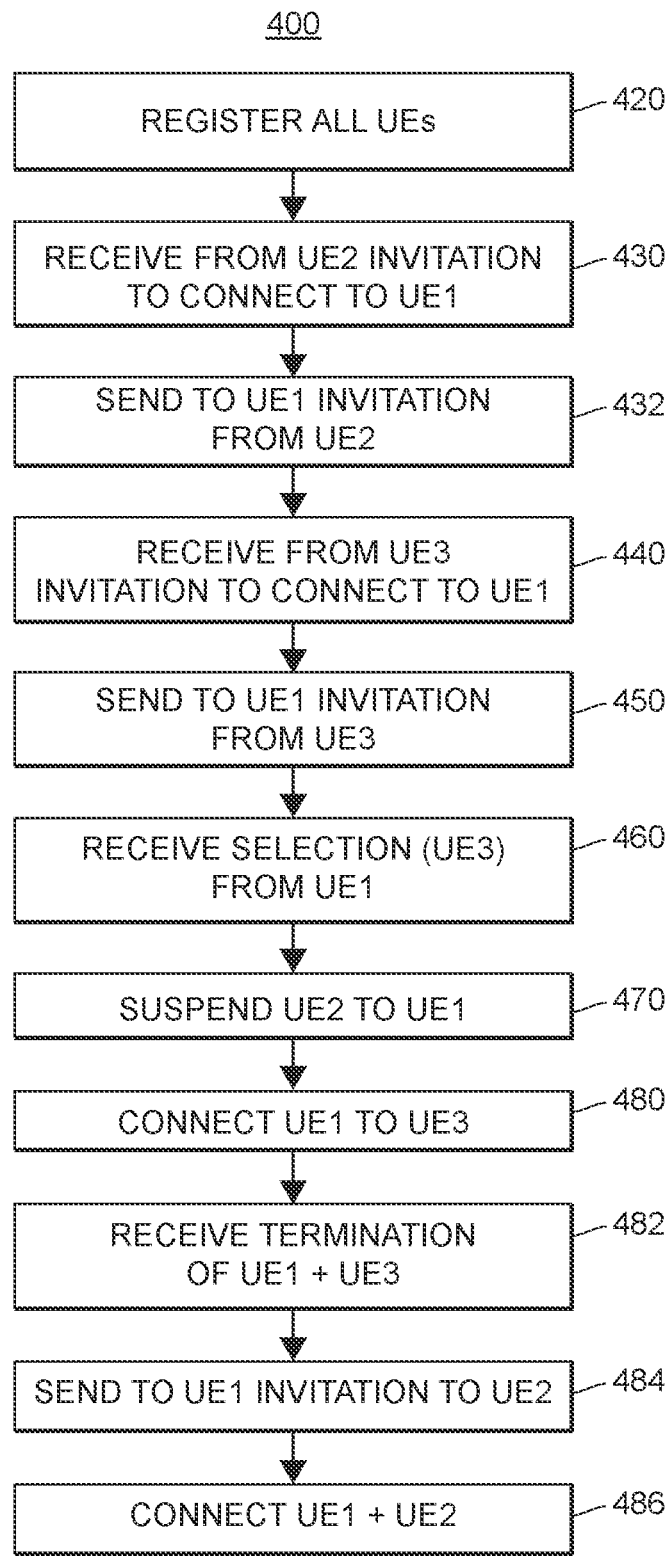
FIG. 4 illustrates a method flow chart in accordance with some embodiments of the present disclosure.

FIG. 4 is a flow chart illustrating a method 400 in accordance with an embodiment of the present disclosure. The method 400 may be implemented by the AS 150 to manage communication connections upon the occurrence of appropriate conditions (i.e., receiving a second conflicting attempt to establish communication involving a UE while a first communication connection involving the same UE is being set up). This flow chart assumes that the CW feature has been enabled for all devices at the HSS 140. In block 420, the UEs (UE1 101, UE2 102, and UE3 203) are then registered at the AS 150, as would be consistent with the SIP protocol.

In block 430, the AS 150 receives from UE2 102 a SIP INVITE message containing parameters to connect UE2 102 to UE1 101. In block 432 of this figure, the AS 150 sends to UE1 101 the invitation from UE2 102. In block 440 of this figure, prior to establishing the first connection between UE2 102 and UE1 101, the AS 150 then receives another SIP INVITE message, this time from UE3 203 asking to initiate another connection, also to UE1 101. In block 450, the AS 150 forwards this second SIP INVITE to UE1 before the user associated with UE1 101 acknowledges the invitation from UE2 102. UE1 101 should then have a call being set up to UE2 102 as well as an incoming notification that UE3 203 wishes to communicate.

The choice of accepting the communication from UE3 203 or connecting with UE2 102 is presented at the UE1 101 user interface. The user of UE1 101 is prompted to make a selection between connecting with either UE 2 102 or UE 3 203 or with neither (e.g., ignoring both calls). In block 460, the AS 150 receives the notification that the user associated with UE1 101 has decided to communicate with UE3 203. This notification, for example could be transmitted in the payload of a SIP MESSAGE command. In block 470, we see the AS 150 suspending the unselected communication, which may involve placing the communication on hold, or terminating the call with UE2 102 via a SIP BYE message. Alternately, the AS 150 could be configured to return a busy signal to UE2 102, or route UE2 102 to the voicemail box of UE1 101, which may optionally include an outgoing announcement. In block 480, UE1 and UE3 are connected as previously selected by UE1 101. In block 482, the connection is terminated at the request of either UE1 101 or UE2 101. In the SIP protocol, this is accomplished by a BYE message received by the AS 150 as shown in block 484 that is responded to by a "200 OK" message.

Once the communication between UE1 and UE3 203 has been completed, in one embodiment, as shown in block 484, we see that the AS 150 may automatically restart the communication between UE2 102 and UE1 101 by sending a SIP INVITE message immediately after UE1 101 has completed its preferred call. Upon receiving a response, the AS 150 may connect UE2 102 and UE1 101 as shown at block 486. In yet another embodiment, the AS 150 may be configured to prompt the user associated with UE1 101 to select an option to connect to UE2 102 if they want to complete a communication to UE2 102, which UE1 101 had previously terminated, suspended or placed on hold.

Figure 5:
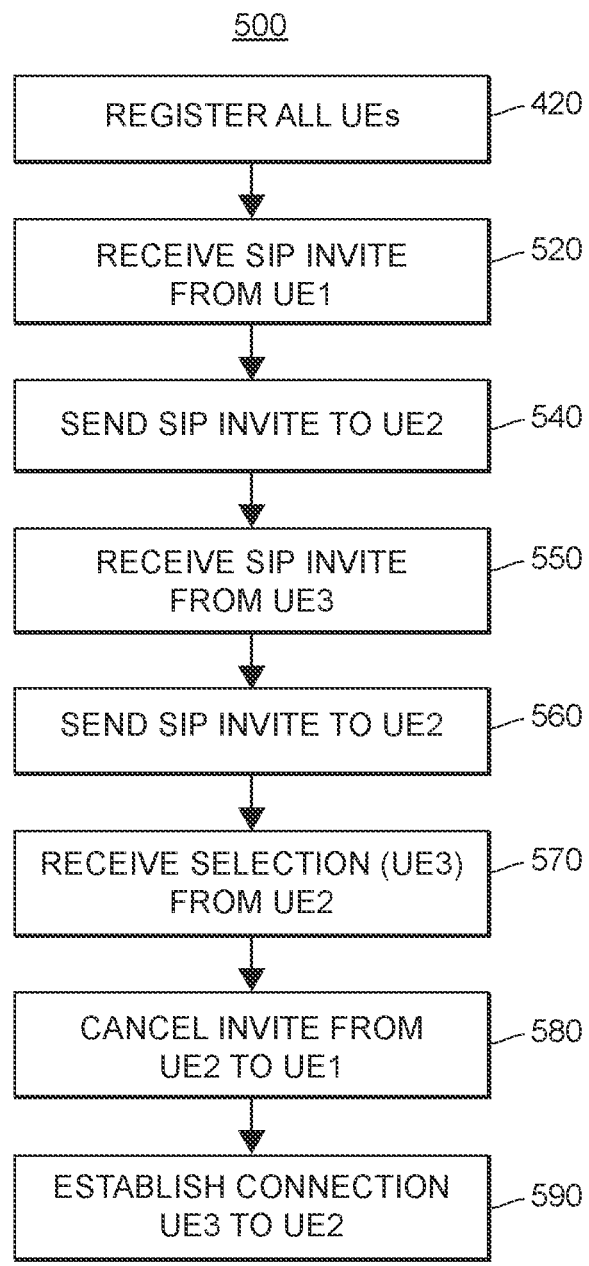
FIG. 5 illustrates a method flow chart in accordance with further embodiments of the present disclosure.

FIG. 5 illustrates a flow chart of a method 500 in accordance with another embodiment of the present disclosure. The method 500 may be implemented by the AS 150 to manage communication connections upon the occurrence of appropriate conditions (i.e., receiving a second conflicting attempt to establish communication involving a UE while a first communication connection involving the same UE is being set up). In FIG. 5, a communication is being set up between UE2 101 and UE1 101 when another communication is received by the AS 150 from UE3 destined for UE2.

In block 420 of FIG. 5, the communication devices UE1 101, UE2 102, and UE3 203 are all registered with the AS 150. Next, in block 530, the AS 150 receives a SIP INVITE from UE2 102 destined for UE1 101. In block 540, shortly thereafter, the AS 150 forwards the SIP INVITE to UE1 101. In block 550, prior to receiving a response from UE1 101, the AS 150 receives another invitation from UE3 203 destined for UE2 102. At block 560, the AS 150 forwards this SIP INVITE from UE3 203 to UE2 102. At this point UE2 102 has not received acknowledgement from UE1 101. The user of UE2 102 is then prompted with a choice to continue communication with UE1 101 or select the incoming communication from UE3 203. At block 570, the AS 150 receives a selection message from UE2 102, which (in this example) contains a selection of the preferred communication from UE3 203. For example, this selection may be carried in the body of a SIP MESSAGE command or another appropriate message. In block 580, the AS 150 then cancels the communication being setup between UE2 102 and UE1. Then, in block 590, the AS 150 continues to establish the connection between UE3 203 and UE2 102.

FIG. 6 illustrates a sample screen of UE1 101 as it might interact with method 400. In this embodiment of the innovation, UE1 101 is illustrated after it has received a second incoming communication before the first incoming communication has been acknowledged. In this figure, UE1 101 has a screen 602, which displays an indication of a first incoming communication 610 that has not yet been acknowledged, as well as an indication of a second incoming communication 620 that has also not yet been acknowledged. Either communication is available to be answered by the user of UE1. The user interface on the screen 602 also includes an accept button 612 for the first communication and an accept button 614 for the second communication. Alternately, the user may be presented with a choice to decline a communication, which may cause the system to default to accepting the remaining communication.

If the user chooses to accept the first communication by selecting button 612, the AS 150 may be configured, by implementing instructions on its non-transitory computer-readable storage medium, to cause the second caller to receive a busy signal or the second caller to be routed to voicemail or placed on hold, and the communication continues with the first caller. If the user chooses to accept the second communication via the accept button 614 or other means, the AS 150 may similarly cause the first caller to receive a busy signal, be placed on hold, or routed to voicemail, and the second communication is then connected. Alternately, the executable instructions stored on the AS 150 may be configured to cause the processor of the AS 150 to put the first caller on hold when the second caller is accepted by selection of the accept button 614 or similar acknowledgement by the user. The AS 150 may also be configured to give a recorded announcement ("please stand by") or a Short Message Service (SMS) or Multi-Media Message (MMS) message to the first caller while on hold to indicate their communication will be restarted shortly. The AS 150 may be further configured to support toggling by the user of UE1 101 between a communication placed on hold and the previously connected party. In another embodiment, the AS 150 is configured to automatically connect UE1 101 with any parties that were suspended or on hold when a previous communication is terminated. For example, the AS 150 may be configured to maintain a record of the party on hold and send a SIP INVITE to the party on hold when the previous communication is toggled or terminated.

FIG. 7 illustrates a sample screen of a user device that has received an incoming communication while still setting up an outgoing communication as per method 500. Illustrated is UE2 102, which contains a screen 702. The screen shows an indicator of an outgoing communication 710 to a carpet company that is in ring back status 712 as may be indicated on the display or with an audio ring back. While the outgoing communication is being setup, and before it is answered, UE2 102 receives a notification of an incoming communication 720 from another device, which may be more important to the user of UE2 102 than the outgoing communication 710. In this example, the user of UE2 is given an option of selections to accept 722 or reject 724 the incoming communication that is available to be answered or acknowledged. In this example, the incoming call from "Jenny" may be more important than the not yet answered outgoing call to a carpet company. An acceptance of the incoming communication would result in a cancelation or postponement of the outgoing communication. A rejection of the incoming communication or selection to continue the outgoing communication would result in the incoming call receiving a busy signal, being placed on hold, a recorded announcement or being routed to voicemail with the call routing configured in the non-transitory computer-readable storage medium of AS 150. The AS 150 may be further configured to prompt the user of UE2 102 to continue or restart the outgoing communication after the termination of the previously selected incoming communication.

For ease of explanation, the disclosure may generally refer to specific components as performing the various calculations and other functions implemented by the embodiments described herein. However, it will be understood that any suitable function described herein is not limited to the particular component for which its functionality is described.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

Throughout this specification, plural instances may implement components, operations, or structures described as a single instance. Although individual operations of one or more methods are illustrated and described as separate operations, one or more of the individual operations may be performed concurrently in some instances. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

What is claimed:

1. A method for handling a second incoming communication received after a first communication is initiated and before the first communication is acknowledged by a recipient, comprising:
   receiving, at an application server, a message from a first communication device to initiate a communication to a second communication device;
   sending, from the application server to the second communication device, a message to initiate the communication to the first communication device,
   receiving, at the application server, a message from a third communication device to initiate a communication to the second communication device before a user of the second communication device has acknowledged the communication from the first communication device;
   sending, by the application server, a message to the second communication device causing the second communication device to prompt the user of the second communication device to select an option to accept the communication from the third communication device before the communication to the second communication device is acknowledged by the user of the second communication device;
   receiving, at the application server from the second communication device, a message to select communication with the third communication device;
   routing, by the application server, the communication from the first communication device to voicemail; and
   connecting, by the application server, the third communication device to the second communication device for communication.

2. The method of claim 1, further comprising:
   receiving, at the application server, a message indicating a request to terminate the communication between the second communication device and the third communication device;
   terminating, by the application server, the communication between the second communication device and the third communication device; and
   sending, by the application server, a message to reinitiate the communication between the first communication device and the second communication device.

3. A non-transitory computer-readable storage medium storing executable instructions that, when executed by a processor of an application server, cause the processor to:
   receive a notification to initiate an outgoing communication from a first communication device associated with a first user to a second communication device associated with a second user;
   receive a second notification from a third communication device initiating a communication from the third communication device to the first communication device before the second communication device has acknowledged the communication waiting from the first communication device;
   receive an indication from the first communication device of a selection of the communication from the third communication device before the second communication device has acknowledged the communication waiting from the first communication device;
   connect the first communication device and the third communication device; and
   continue the communication between the first communication device and the second communication device when the communication between the first communication device and the third communication device is terminated.

4. The non-transitory computer-readable storage medium of claim 3, further storing executable instructions that, when executed by the processor, cause the processor to:
   send a message to the first communication device that an incoming communication from a third communication device is available to be answered,
   wherein the message causes the first communication device to prompt the first user to indicate a selection of the incoming communication.

5. The non-transitory computer-readable storage medium of claim 3, further storing executable instructions that, when executed by the processor, cause the processor to place the outgoing communication from the first communication device to the second communication device on hold when the communication between the first communication device and the third communication device is connected by the application server.

6. The non-transitory computer-readable storage medium of claim 5, further storing instructions that, when executed by the processor, continues the communication between the first communication device and the second communication device when the communication between the first communication device and the third communication device is toggled by the first user.

7. The non-transitory computer-readable storage medium of claim 3, further storing executable instructions that, when executed by the processor, cause the processor to terminate the outgoing communication from the first communication device to the second communication device when the communication between the first communication device and the third communication device is connected by the application server.

8. A system for handling an incoming communication received before an outgoing communication is answered, comprising:
   one or more processors;
   a memory operatively connected to the one or more processors and storing executable instructions that, when executed by the one or more processors, cause the system to:
      receive a message to initiate an outgoing communication from a first communication device associated with a first user to a second communication device associated with a second user;
      receive a second message from a third communication device to initiate an outgoing communication to the first communication device before the second user has acknowledged the communication waiting from the first communication device;

receive an indication from the first communication device of a selection of the communication from the third communication device before the second communication device has acknowledged the communication waiting from the first communication device;

connect the incoming communication between the first user and the third communication device; and either (i) send, to the second communication device, a message to place the communication between the first communication device and the second communication device on hold or (ii) automatically reinitiate the communication from the first communication device to the second communication device when the communication from the third communication device and the first communication device is terminated.

9. The system of claim 8, wherein the executable instructions cause the system to place the communication between the first communication device and the second communication device on hold and further cause the system to:

reinitiate the communication from the first communication device to the second communication device when the communication from the third communication device and the first communication device is toggled by the first user.

10. The system of claim 8, wherein the executable instructions further cause the system to:

send, to the first communication device, a message that an incoming communication from a third communication device is available to be answered, wherein the message causes the first communication device to prompt the first user to send a selection of a preferred communication; and receive, from the first communication device, a message containing the selection of the preferred communication.

\* \* \* \* \*